Sept. 21, 1926.

W. G. CRAIG ET AL 1,600,536

TRACTOR HITCH

Filed Feb. 10, 1926

Inventors:
Wallace G. Craig
Homer C. Wilson
By Wilson & McCanna
Attys.

Patented Sept. 21, 1926.

1,600,536

UNITED STATES PATENT OFFICE.

WALLACE G. CRAIG, OF KIRKLAND, AND HOMER C. WILSON, OF MONROE CENTER, ILLINOIS.

TRACTOR HITCH.

Application filed February 10, 1926. Serial No. 87,213.

This invention relates to tractor hitches for farm implements generally and more particularly corn pickers and similar harvesters which are drawn in a laterally offset relation to the tractor.

The principal object of the invention is to provide an extremely simple and economical type of tractor hitch whereby the trailing implement is always kept in a definite offset relation to the tractor and whereby lighter draft is secured by virtue of the fact that the forward end of the implement tongue is supported in elevated relation to the ground without the use of a tongue truck.

The invention is clearly described in the following specification in which reference is made to the accompanying drawing of an embodiment of our invention, wherein—

Figure 1:
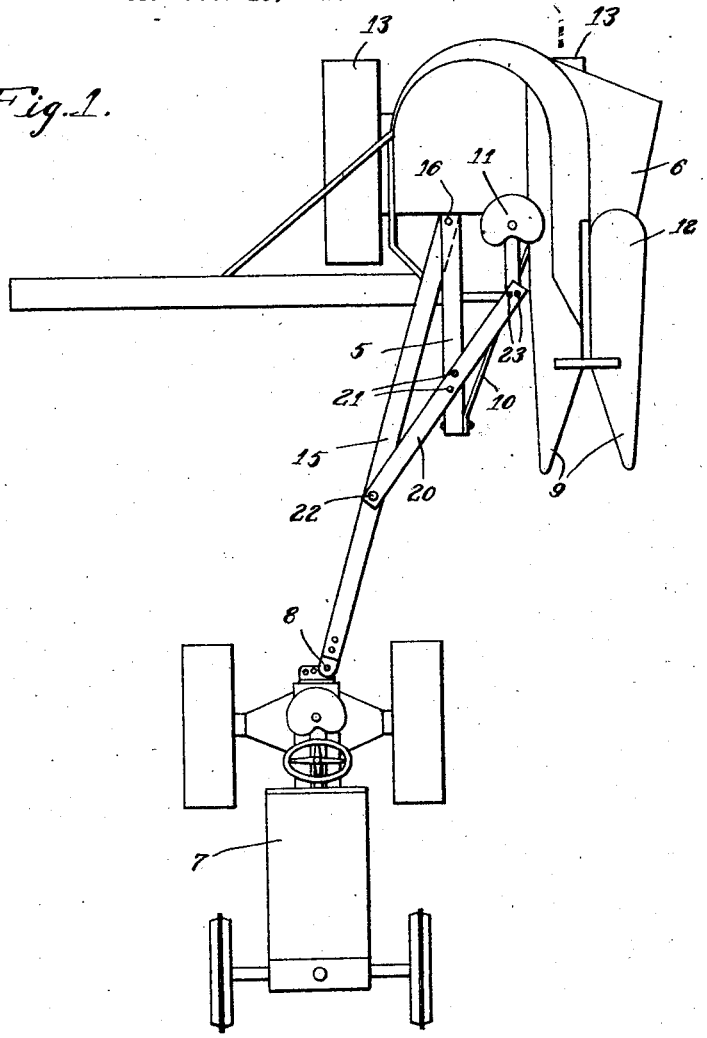
Figure 2:
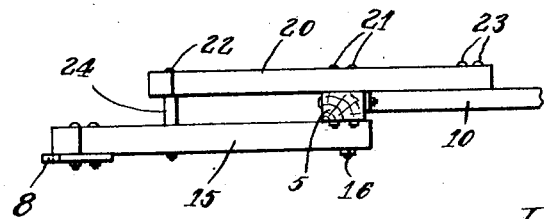

Fig. 1 is a plan view of a tractor and corn picker hitched together in accordance with our invention; and Fig. 2 is a front end view of the hitch.

Throughout the views, similar reference numerals are used to designate corresponding parts.

Tractor draft connections for corn pickers and other harvesting implements have in the past comprised simply a draft tongue or draw bar hitched to a tongue truck on the forward end of the stub tongue 5 of the corn picker or other implement 6 and having connection with the tractor 7 by means of a clevice or other draft connection at 8 to provide for the tractor running to one side and in front of the trailing implement substantially in the relation shown. The trailing implement was kept on its course merely by the truck which often was thrown to one side or another by the uneven ground or by becoming mired in soft ground so that it was hard to keep the fingers 9 of the snapping rolls in their proper relation to the row of corn being harvested. Furthermore, the truck carried a load of about four hundred pounds through a brace rod 10 extending off the side of the tongue 5 rearwardly at an acute angle and supporting a seat 11 and a part of the weight of the husker housing 12. Obviously, the rest of the load was carried by the main wheels 13. The heavy load on the truck increased the draft and in wet weather the truck wheels easily became mired.

According to the present invention, we eliminate the tongue truck entirely and provide a main draft tongue 15 supported at its rear end on the implement 6, or more particularly, at the rear end of the stub tongue 5 of the implement and secured thereto, as indicated by the bolt 16. The tongue 15 extends forwardly at an acute angle to the line of draft of the implement 6 and is supported at its forward end on the tractor 7 and suitably secured thereto by means of the connection 8. A secondary tongue 20 extends diagonally across the front end of the tongue 5 at an acute angle to it and the tongue 15. Bolts 21 are provided for securing the tongue 20 to the tongue 5, as shown. The forward extremity of the tongue 20 is bolted, as shown at 22, to the tongue 15 while the rearward extremity is bolted, as shown at 23, to the brace rod 10 preferably at the point where the seat 11 is secured. The tongue 20 by virtue of these connections serves to support the forward end of the implement tongue 5 elevated off the ground. The height of the front end of the tongue 5 and hence indirectly of the corn picker fingers 9 is determined by the length of a spacer 24 which may be in the form of a block or may conveniently be provided by a pipe or tube of the proper length having the bolt 22 passing therethrough. The tongue 20 further serves to maintain a definite offset draft relation between the tongues 5 and 15 so that the line of draft of the trailing implement 6 is offset laterally at all times a predetermined distance with respect to the fore-and-aft axis of the tractor. This relationship will, of course, remain undisturbed despite uneven ground or wet weather and a lighter draft is secured since there are no truck wheels to become mired in the ground.

It is believed that the foregoing conveys a clear understanding of the objects prefaced above, and while we have illustrated but a single working embodiment, it should be understood that changes might be made in details of construction without departing from the spirit and scope of the invention as expressed in the appended claims.

We claim:

1. In a tractor hitch, the combination with a tractor having a rear hitching element and a trailing implement having a forwardly extending tongue, of means for hitching said implement to said tractor in laterally offset relation thereto while supporting the forward end of said tongue elevated off the ground to obviate the necessity for providing a tongue truck therefor, comprising a main draft tongue extending at an acute angle to the fore-and-aft axis of said tractor having its rear end supported on and fixed to said implement at the rear end of said implement tongue and supported at its forward end on said tractor while secured to the rear hitching element thereof, and a secondary draft tongue extending at an acute angle to said main tongue rearwardly across the front end of the implement tongue and beyond the same whereby to be supported at the rear end thereof on said implement and to be secured thereto, said secondary tongue being secured to said main tongue and said implement tongue where it crosses the same whereby to maintain a definite offset draft relation therebetween and serve to hold said implement tongue elevated.

2. In a tractor hitch for a farm implement, the combination with a forwardly extending implement tongue and a brace rod extending off the side of said tongue rearwardly at an acute angle to support a part of the implement such, for example, as a seat or other part of the implement, of a main draft tongue supported at its rear end at the rear end of said implement tongue and secured thereto and extending forwardly at an acute angle to the line of draft of said implement to be supported at its forward end and secured to a tractor, and a secondary tongue extending diagonally across said implement tongue and secured thereto at the forward end of the latter, the forward extremity of said secondary tongue being secured to said main draft tongue and the rearward extremity thereof being secured to said brace rod whereby to maintain the forward end of said implement tongue elevated in about the same plane as the main draft tongue.

3. In a tractor hitch for a farm implement, the combination with a forwardly extending implement tongue and a brace rod extending off the side of said tongue rearwardly at an acute angle to support a part of the implement such, for example, as a seat or other part of the implement, of a main draft tongue supported at its rear end at the rear end of said implement tongue and secured thereto and extending forwardly at an acute angle to the line of draft of said implement to be supported at its forward end and secured to a tractor, a secondary tongue extending diagonally across said implement tongue and secured thereto at the forward end of the latter, the forward extremity of said secondary tongue being secured to said main draft tongue and the rearward extremity thereof being secured to said brace rod whereby to maintain the forward end of said implement tongue elevated in about the same plane as the main draft tongue, and spacing means in the connection between the forward extremity of said secondary tongue and said main draft tongue whereby to secure a predetermined elevation of the forward end of said implement tongue.

4. In a tractor hitch for use in connection with a tractor and an implement, a frame arranged to have one end secured to and supported on the tractor and its other end secured to the implement, the latter end of said frame having an offset portion supporting the tongue of said implement whereby to eliminate the tongue truck, said offset portion serving also to hold the implement on a course offset in relation to the course of the tractor, and means in the connection between the offset portion of said frame and said tongue to determine the extent of elevation of said tongue.

5. In a tractor hitch, the combination with a tractor, and a trailing implement provided with a forwardly extending tongue having a brace extending off one side thereof, of a hitching frame arranged to have one end secured to and supported on the tractor and its other end secured to the implement, the latter end of said frame having an offset portion extending across the tongue and brace and having connection with said tongue and brace whereby to support said tongue and eliminate the use of a tongue truck, said offset portion serving also to hold said implement on a course offset in relation to the course of the tractor.

6. In a tractor hitch the combination with a tractor, and a trailing implement provided with a forwardly extending tongue having a brace extending off one side thereof, of a hitching frame arranged to have one end secured to and supported on the tractor and its other end secured to the implement, the latter end of said frame having an offset portion extending across the tongue and brace and having connection with said tongue and brace whereby to support said tongue and eliminate the use of a tongue truck, said offset portion serving also to hold said implement on a course offset in relation to the course of the tractor, and means in said frame for determining the extent of elevation of the implement tongue.

WALLACE G. CRAIG.
HOMER C. WILSON.